United States Patent [19]
Morita

[11] Patent Number: 4,779,033
[45] Date of Patent: Oct. 18, 1988

[54] DEVICE FOR DRIVING STEPPING MOTOR
[75] Inventor: Naoyuki Morita, Kanagawa, Japan
[73] Assignee: Fuji Photo Film Co., Ltd., Kanagawa, Japan
[21] Appl. No.: 44,860
[22] Filed: May 1, 1987
[30] Foreign Application Priority Data
  May 1, 1986 [JP] Japan ................................. 61-101611
[51] Int. Cl.⁴ ............................................. H02P 8/00
[52] U.S. Cl. ..................................... 318/696; 318/685
[58] Field of Search ............. 318/969, 685; 310/49 R
[56] References Cited
  U.S. PATENT DOCUMENTS
  3,077,555  2/1963  Fredrickson ...................... 310/49 R
  4,081,703  3/1978  Madsen et al. .................... 310/49 R Primary Examiner—William M. Shoop, Jr.
Assistant Examiner—M. Bergmann
Attorney, Agent, or Firm—Sughrue, Mion, Zinn, Macpeak, and Seas

[57]  ABSTRACT

A stepping motor driving device of this invention includes: a first ROM for outputting an intermittent drive signal, a second ROM for outputting a continuous drive signal, a bus selector into which these signals are input, the bus selector also selectively outputting either one of these signals in response to a selection signal, and a driver for driving the stepping motor intermittently or continuously on the basis of the signal selected by the bus selector. In consequence, the stepping motor can be driven intermittently or continuously by a single driver.

12 Claims, 3 Drawing Sheets

4,779,033

DEVICE FOR DRIVING STEPPING MOTOR

BACKGROUND OF THE INVENTION

1. Field of the Invention

The present invention relates to a device for driving a stepping motor.

2. Description of the Prior Art

An exposure apparatus has heretofore been known which includes an exposure head having light-emitting elements and a rotating drum having a cylindrical surface disposed opposite the exposure head, and which horizontally scans a photosensitive material wound around the rotating drum by rotating the rotating drum around the shaft thereof and vertically scans it by moving the exposure head in the axial direction of the rotating drum so as to expose the exposure surface of the photosensitive material. Such an exposure apparatus employs a stepping motor for moving the exposure head along the axis of the rotating drum. The stepping motor is driven during the vertical scanning of the exposure by a drive signal which is either a video signal or a digital signal. When the exposure is conducted with a video signal, it is necessary for the stepping motor to be driven continuously. With the latter, the stepping motor is required to be driven intermittently. Conventionally, the stepping motor is therefore driven by two separate drive devices: one which is employed when the exposure is conducted with the video signal and the other being employed with the digital signal.

As two types of devices for driving the stepping motor are necessary in the known exposure apparatus in correspondence with the signal employed, the exposure apparatus must be equipped with devices of two types if the photosensitive material is exposed with either video or digital signals. Further, both the drive device specifically used for digital signals and the drive device for video signals must be manufactured, and the total number of parts required for the two drive devices is therefore raised, increasing the production cost.

SUMMARY OF THE INVENTION

In view of the above-described disadvantages of the prior art, it is an object of the present invention to provide a device for driving a stepping motor which is capable of being switched over so as to perform either an intermittent drive or a continuous drive.

According to the present invention, the above-described object is achieved by providing a stepping motor drive device which comprises: an intermittent drive signal output means for outputting an intermittent drive signal which drives a stepping motor intermittently; a continuous drive signal output means for outputting a continuous drive signal which drives the stepping motor continuously; a drive means for driving the stepping motor on the basis of either the intermittent drive signal or the continuous drive signal; a switch over means for inputting either the intermittent drive signal or the continuous drive signal to the drive means.

According to the presnnt invention, either the intermittent drive signal which drives the stepping motor intermittently or the continuous drive signal which drives the stepping motor continuously is input to the drive means, the former being from the intermittent drive signal output means and the latter being from the continuous drive signal output means. The drive means drives the stepping motor intermittently or continuously on the basis of the intermittent drive signal or the continuous drive signal. As a result, the stepping motor can be driven intermittently or continuously simply by selecting the appropriate drive signal by means of the switch over means.

As can be seen from the above description, a stepping motor can be driven intermittently or continuously by the single drive device according to the present invention by appropriate switch-over of the drive signal. If this stepping motor drive device is applied to an exposure apparatus, a single drive device can be employed for the exposure with either a video signal or a digital signal. This enables the parts of the drive device to be used in common for both functions and the single device can thus be multifunctional. As a result, the number of functions of the device can be increased without any increase in the production cost.

BRIEF DESCRIPTION OF THE DRAWINGS

FIG. 5 (B) is a side view of the exposure head employed when the stepping motor is intermittently driven.

DESCRIPTION OF THE PREFERRED EMBODIMENT

The present invention will be hereinunder described with reference to the accompanying drawings by way of example in which a stepping motor driving device of this invention is adapted for use in an exposure apparatus.

Figure 2:
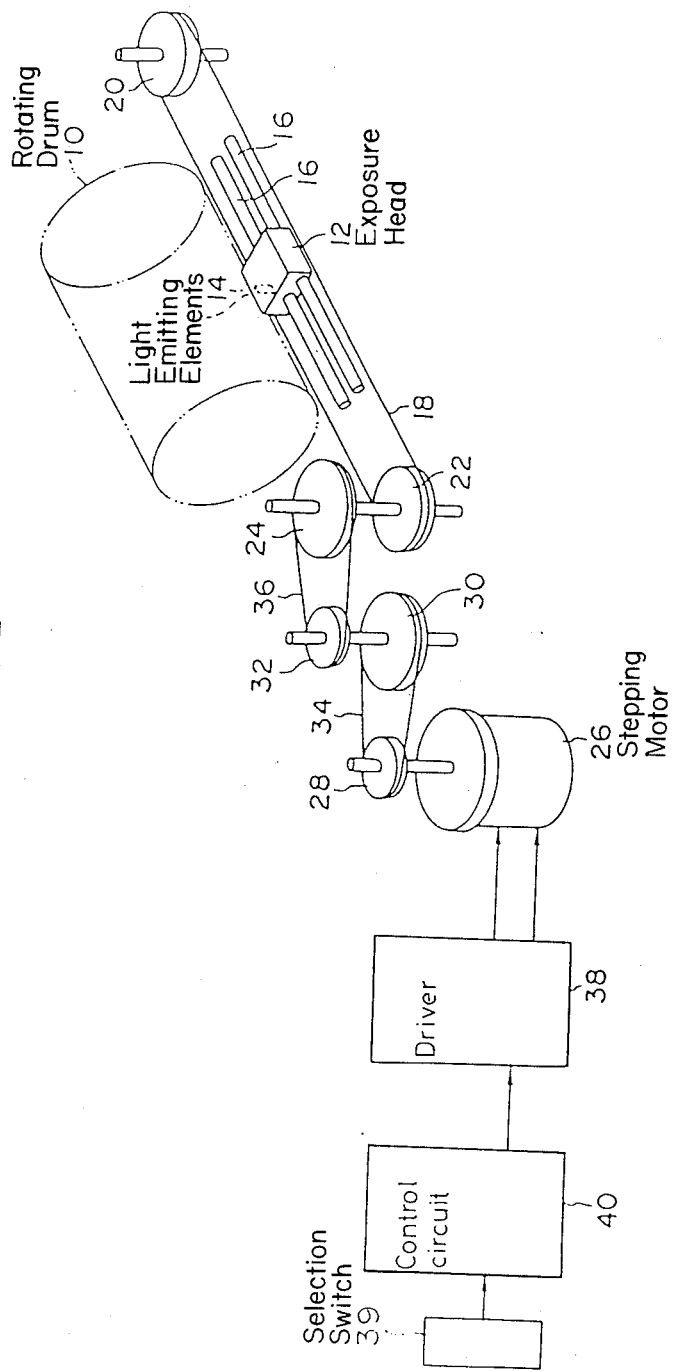
FIG. 2 is a schematic view of an exposure apparatus incorporating the stepping motor drive device of the present invention.

FIG. 2 is a schematic view of an exposure apparatus incorporating the stepping motor driving device of this invention. The exposure apparatus includes an exposure head 12 disposed in such a manner that it faces the cylindrical surface of a rotating drum 10 at the side thereof on which light-emitting elements 14 are mounted. The exposure head 12 is slidably mounted on a pair of guide shafts 16 disposed parallel to the axis of the rotating drum 10. An idle reel 20 is rotatably mounted on one end of each of the guide shafts 16, while a wire reel 22 is rotatably mounted on the other end thereof. A wire 18 is extended between the idle reel 20 and the wire reel 22 while being fixed to the exposure head 12 at the side thereof which is closer to the rotating drum 10. A large reel 24 is fixed to the shaft of the wire reel 22 in such a manner as to be rotatable together with the wire reel 22. A small reel 28 is fixed to the output shaft of a stepping motor 26. A large reel 30 and a small reel 32 are disposed concentrically between the wire reel 22 and the stepping motor 26 in such a manner as to be movable together. A synchronizing belt 34 is extended between the small reel 28 and the large reel 30, while a synchronizing belt 36 is extended between the small reel 32 and the large reel 24. As a result, when the small reel 28 is rotated by the rotation of the output shaft of the stepping motor 26, the wire reel 22 is rotated through the synchronizing belt 34, the large reel 30, the small reel 32, the synchronizing bell 36, and the large reel 24, so that the wire 18 is moved in the longitudinal direction of the guide shafts 16 so as to move the exposure head 12 therealong. At this time, the exposure head 12 may be moved back and forth along the guide shafts 16 by changing the rotational direction of the stepping motor 26.

The stepping motor 26 has four fixed field poles consisting of an A phase and an $\overline{A}$ phase which are in series with each other and a B phase and a $\overline{B}$ phase which are connected in series with each other, to which a driver 38 serving as a driving means is connected. A control circuit 40, which is connected to a selection switch 39 by which the intermittent drive and the continous drive are selected, is connected to the driver 38.

Figure 1:
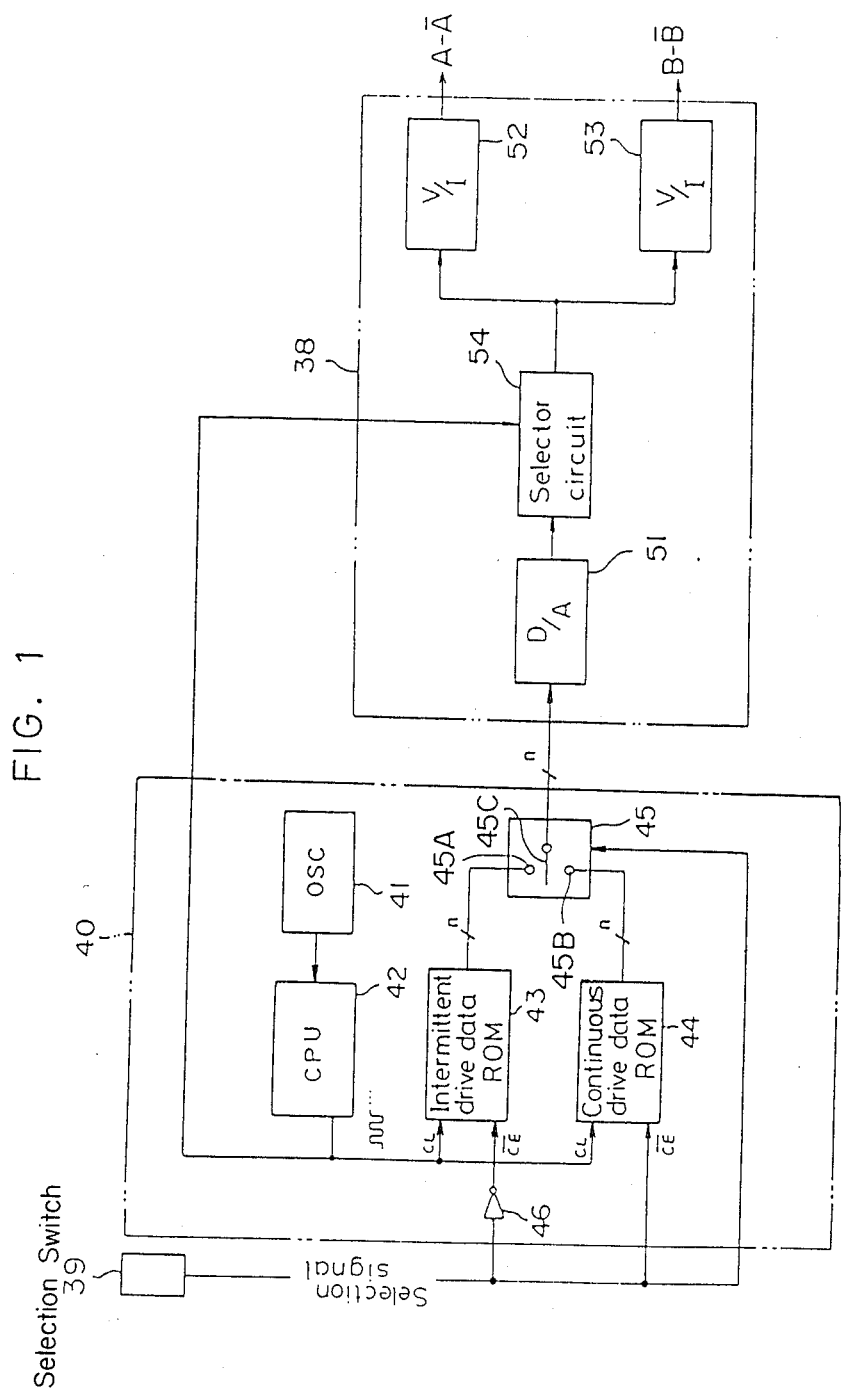
FIG. 1 is a block diagram of a driver and a control circuit which are included in an embodiment of a stepping motor drive device according to the present invention.

The driver 38 and the control circuit 40 will be described in detail below by referring to FIG. 1. The control circuit 40 includes a read-only-memory (ROM) 43 for storing intermittent drive data to be used for intermittently driving the stepping motor, the ROM 43 having a clock terminal CL and an enable terminal $\overline{CE}$, a ROM 44 for storing continuous drive data to be used for driving the stepping motor continously, the ROM 44 having a clock terminal CL and an enable terminal $\overline{CE}$, a central processing unit (CPU) 42, and a bus selector 45. The CPU 42, to which a clock oscillator (OSC) 41 is connected, is connected to the clock terminal CL of the ROM 43, the clock terminal CL of the ROM 44, and the driver 38. The selection switch 39 is connected to the enable terminal $\overline{CE}$ of the ROM 43 through an inverter 46, and the output terminal of the ROM 43 is connected to an input terminal 45A (a first input terminal) of the bus selector 45. The selection switch 39 is directly connected to the enable terminal $\overline{CE}$ of the ROM 44, and the output terminal of the ROM 44 is connected to an input terminal 45B (a second input terminal) of the bus selector 45. The bus selector 45 is selectively connected to the ROM 43 or the ROM 44, and has a movable terminal 45C (an output terminal) connected to the driver 38, by which it connects the ROM 43 or the ROM 44 to the driver 38 responsive to the selection signal sent from the selection switch 39.

The driver 38 includes a digital-analogue converter (D/A) connected to the output terminal of the bus selector 45, a selector crcuit 54, a voltage-current-converter (V/I) 52 connected to the A-$\overline{A}$ phases of the stepping motor, and a voltage-current-converter (V/I) 53 connected to the B-$\overline{B}$ phases of the stepping motor.

Figure 3:
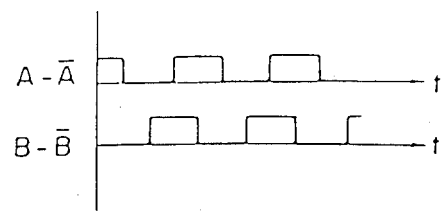
FIG. 3 is a graph of an intermittent drive data.
Figure 4:
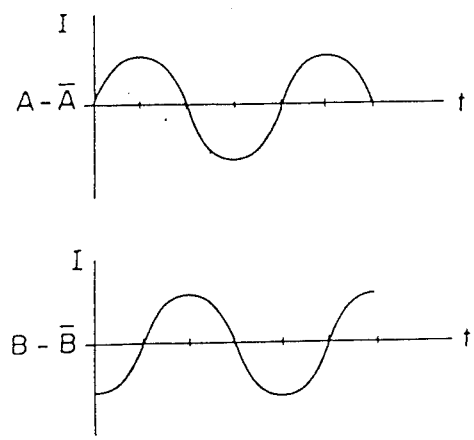
FIG. 4 is a graph of a continuous drive data.

The ROM 43 stores beforehand the intermittent drive data having the form of a pulse, as shown in FIG. 3. The intermittent drive data consists of the A-$\overline{A}$ phases drive data and the B-$\overline{B}$ phases drive data, and represents the feed of the stepping motor through n (an integer of 1 or above). When a high level signal is input to the enable terminal $\overline{CE}$ of the ROM 43, the A-$\overline{A}$ phases drive data or the B-$\overline{B}$ phases drive data is sequentially output from the ROM 43 in response to the clock signal input from the CPU 42. The ROM 44 stores beforehand the continous drive data which has the form of a sine wave, as shown in FIG. 4. The continous drive data consists of the A-$\overline{A}$ phases drive data and the B-$\overline{B}$ phases drive data which lags the A-$\overline{A}$ phases drive data by a phase difference of approximately $\pi/2$, and represents the rotation of the stepping motor through a motor electrical angle of k (an integer of 1 or above). When a high level signal is input to the enable terminal $\overline{CE}$ of the ROM 44, the A-$\overline{A}$ phases drive data or the B-$\overline{B}$ phases drive data is sequentially output in response to the clock signal input from the CPU 42.

The operation of the apparatus of this embodiment will be described below. When a high level signal is output from the selection switch 39, a low level signal is input to the enable terminal $\overline{CE}$ of the ROM 43, and a high level signal is input to the enable terminal $\overline{CE}$ of the ROM 44, thereby stopping the operation of the ROM 43 and starting the operation of the ROM 44. At this time, a high level switch over signal is input to the bus selector 45, so that the signal representing the continuous drive data, which is output from the ROM 44, is converted into a voltage by the digital-analogue converter 51 before being input to the selector circuit 54. Since the clock signal has been input from the CPU 42 to the control terminal of the selector circuit 54, the selector circuit 54 is switched over so as to be connected to the voltage-current converter 52 or the voltage-current converter 53 in synchronism with the signal of the ROM 44 which is output in response to the clock signal, i.e., the A-$\overline{A}$ phases are energized through the voltage-current converter 52 when the A-$\overline{A}$ phases drive data is output from the ROM 44, and the B-$\overline{B}$ energized through the voltage-current converter 53 when the B-$\overline{B}$ phases drive data is output from the ROM 44 by the clock signal. As the continuous drive data stored in the ROM 44 represents the rotation of the motor through an electrical angle of k, a cycle of the above-described operations is repeated l times, to drive the stepping motor continuously. k or l is represented by an integer of 1 or above.

On the other hand, when a low level signal is output from the selection switch 39, a high level signal is input to the enable terminal of the ROM 43, and a low level signal is input to the enable terminal of the ROM 44. As a result, the signal representing the intermittent drive data is output from the ROM 43. At this time, since the selection signal, which is output to the bus selector 45, has a low level, the bus selectro 45 selects the ROM 43. The signal representing the intermittent drive data, which is output from the ROM 43, is input through the bus selector 45 to the digital-analogue converter 51 where it is converted to an analogue signal before being input to the selector circuit 54. As the clock signal has been input to the control terminal of the selector circuit 54, the selector circuit 54 is connected to the voltage-current converter 52 or the voltage-current converter 53 in synchronism with the signal output from the ROM 43. Thus, when the signal output from the ROM represents the A-$\overline{A}$ phases drive data, it is input to the voltage-current converter 52 by the selector circuit 54 so as to energize the A-$\overline{A}$ phases. When the output signal is that for the B-$\overline{B}$ phases drive data, it is input to the voltge-current converter 53 so as to energize the B-$\overline{B}$ phases. As the intermittent drive data stored in the ROM 43 represents the feed of the motor through n, a cycle of the above-described operations is repeated m times to drive the stepping motor intermittently. In this case also, n or m is an integer of 1 or above.

Figure 5:
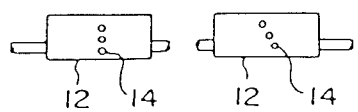
FIG. 5 (A) is a side view of an exposure head employed when the stepping motor is driven continuously.

The stepping motor can be driven intermittently or continuously in the manner described above by switching over the selector 45, and the exposure head can therefore be driven intermittently or continuously in correspondence with a digital or a video signal. The exposure head having light-emitting elements 14 disposed perpendicular to the guide shafts 16 as shown in FIG. 5 (A) is employed when it is continuously driven. On the other hand, the exposure head employed when it is intermittently driven has light-emitting elements 14 disposed in a direction which is inclined with respect to the guide shafts 16.

As will be seen from the foregoing description, since the exposure head of this embodiment can be driven intermittently or continuously, it is possible to expose the photosensitive material responsive to either a video or digital signal by means of a single exposure apparatus.

The stepping motor employed in the above-described embodiment is of the bi-polar type in which the A phase, $\overline{A}$ phase and B phase, $\overline{B}$ phase are connected, respectively. However, the stepping motor to be employed in the present invention is not limited to this type, and a mono-polar stepping motor in which the A phase, $\overline{A}$ phase, B phase, and $\overline{B}$ phase are individually disposed may also be used.

What is claimed is:

1. A stepping motor driving device comprising: a first drive signal output means for outputting an intermittent drive signal which drives said stepping motor intermittently; a second drive signal output means for outputting a continuous drive signal which drives said stepping motor contuously; a drive means for driving said stepping motor on the basis of either said intermittent drive signal or said continuous drive signal; and a bus selector means for outputting either of said intermittent drive signal and said continuous drive signal to said drive means, said bus selector means including a first input terminal connected to the ouput terminal of said first drive signal output means, a second input terminal connected to the ouput terminal of said second drive signal output means, and a movable terminal having one end connected to said drive means and the other end selectively connected to either of said first input terminal or said second input terminal, said movable terminal being selectively connected to either of said first input terminal or said second input terminal by a selection signal sent from a selection means.

2. A stepping motor driving device according to claim 1, wherein said first drive signal output means comprises a first ROM which stores intermittent drive data for driving said stepping motor intermittently.

3. A stepping motor driving device according to claim 2, wherein said second drive signal output means comprises a second ROM which stores continuous drive data for driving said stepping motor continuously.

4. A stepping motor driving device according to claim 3, wherein said drive means includes a digital-to-analog converter connected to said movable terminal, a selector circuit connected to the output terminal of said converter, and a first and second voltage-current converters connected in parallel to the output terminal of said selector circuit, said first voltage-current converter being connected to A-$\overline{A}$ phases of said stepping motor, while said second voltage-current converter being connected to B-$\overline{B}$ phases of said stepping motor.

5. A stepping motor driving device comprising: a control means including an intermittent drive signal output means for outputting an intermittent drive signal which drives said stepping motor intermittently, a continuous drive signal output means for outputting a continuous drive signal which drives said stepping motor continuously, and a bus selector means for outputting either of said intermittent drive signal or said continuous drive signal which have been input thereinto; and a driver into which the output of said bus selector means is input. said driver said stepping motor intermittently or continuously in response to the signal input from said bus selector means, said bus selector means outputting either of said intermittent drive signal or said continuous drive signal in response to a selection signal from a selection means.

6. A stepping motor driving device according to claim 5, wherein said switching over means includes a first input terminal connected to said intermittent drives signal output means, a second input terminal connected to said continuous drive signal output means, and an output terminal connected to either of said first input terminal or said second input terminal in response to said selection signal, said output terminal outputting a signal to said driver.

7. A stepping motor driving device according to claim 6, wherein said intermittent drive signal output means comprises a first ROM which has stored intermittent drive data for driving said stepping motor intermittently, while said continuous drive signal output means comprises a second ROM which stores continuous drive data for driving said stepping data continuously.

8. A stepping motor driving device according to claim 7, wherein said driver includes a digital-analogue converter connected to the output terminal of said bus selector means, a selector circuit connected to said converter, and a first voltage-current converter and a second voltage-current converter which are connected in parallel to said selector circuit, said first voltage-current converter being connected to A-$\overline{A}$ phases of said stepping motor, while said second voltage-current converter being connected to B-$\overline{B}$ phases of said stepping motor.

9. In an exposure apparatus for exposing a photosensitive material wound around the outer periphery of a cylindrical rotating drum by moving an exposure head disposed opposite said photosensitive material in the axial direction of said rotating drum, a device for driving a stepping motor to be used for moving said exposure head, comprising:

an intermittent drive signal output means for outputting an intermittent drive signal which drives said stepping motor intermittently; a continuous drive signal output means for outputting a continuous drive signal which drives said stepping motor continuously; a drive signal selector means into which both said output intermittent drive signal and said continuous drive signal are input, said drive signal selector means outputting either of said signals; and a driver for driving said stepping motor intermittently or continuously in response to the signal output from said drive signal selector means, said drive signal selector means being connected to a selection switch and adapted to output either of said intermittent drive signal or said continuous drive signal in response to a selection signal from said selection switch.

10. A stepping motor driving device according to claim 9, wherein said drive selector signal means includes a first input terminal connector to said intermittent drive signal output means, a second input terminal connected to said continuous drive signal output means, and a movable terminal connected to said driver, said movable terminal also being selectively connected to either of said first input terminal or said second input terminal.

11. A stepping motor driving device according to claim 10, wherein said intermittent drive signal output means is a first ROM which stores intermittent drive data for driving said stepping motor intermittently, while said continuous drive signal output means is a second ROM which has stored continuous drive data for driving said stepping motor continuously.

12. A stepping motor driving device according to claim 11, wherein said driver includes a digital-analogue converter into which the signal output from said bus selector is input, a selector circuit into which the signal output from said converter is input, a first voltage-current converter and a second voltage-current converter which are connected in parallel to said selector circuit, said first voltage-current converter being connected to A-$\overline{A}$ phases of said stepping motor, while said second voltage-current converter being connected to B-$\overline{B}$ phases of said stepping motor.

* * * * *